US009088514B2

(12) United States Patent
Kim et al.

(10) Patent No.: US 9,088,514 B2
(45) Date of Patent: Jul. 21, 2015

(54) FLEXRAY COMMUNICATIONS USING ETHERNET

(71) Applicant: BROADCOM CORPORATION, Irvine, CA (US)

(72) Inventors: Yongbum Kim, Los Altos Hills, CA (US); Kevin Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 77 days.

(21) Appl. No.: 13/716,577

(22) Filed: Dec. 17, 2012

(65) Prior Publication Data
US 2014/0022912 A1 Jan. 23, 2014

Related U.S. Application Data

(60) Provisional application No. 61/674,834, filed on Jul. 23, 2012.

(51) Int. Cl.
G01R 31/08 (2006.01)
H04L 12/931 (2013.01)
H04L 12/40 (2006.01)

(52) U.S. Cl.
CPC ........ *H04L 49/351* (2013.01); *H04L 12/40163* (2013.01); *H04L 49/35* (2013.01); *H04L 2012/40241* (2013.01); *H04L 2012/40273* (2013.01)

(58) Field of Classification Search
CPC ....... H04L 12/437; H04L 45/28; H04L 45/22; H04L 12/42; H04L 3/085; H04L 45/00; H04L 12/4633; H04L 12/66; H04L 45/24; H04L 45/44; H04L 12/2801; H04L 12/2861; H04L 12/413; H04L 69/08; H04L 29/06; H04L 69/18; H04L 61/251; H04L 12/4625; H04B 7/2643; H04B 7/2656
USPC .......................... 370/224, 401, 392, 442, 390
See application file for complete search history.

(56) References Cited

U.S. PATENT DOCUMENTS 8,705,527 B1 * 4/2014 Addepalli et al. ............ 370/389
2004/0081079 A1 4/2004 Forest et al.
(Continued)

OTHER PUBLICATIONS

Steinhammer, et al., "A Time-Triggered Ethernet (TTE) Switch," Design, Automation and Test in Europe, Mar. 2006, 6 pages.
(Continued)

*Primary Examiner* — Andrew Chriss
*Assistant Examiner* — Atique Ahmed
(74) *Attorney, Agent, or Firm* — McDermott Will & Emery LLP

(57) ABSTRACT

Systems and methods for implementing FlexRay communications between FlexRay nodes using Ethernet are provided. An Ethernet switch includes ports, each of which receives an Ethernet data packet (EDP) from a respective FlexRay node. Each EDP includes a FlexRay message, which includes at least one of a data frame and a frame identification (ID). A first EDP is received at a first port no later than a second EDP is received at a second port. The Ethernet switch also includes a controller module that determines whether the second EDP has higher priority than the first EDP based on the frame IDs associated with the first and second EDPs. The controller module is configured to route the second EDP to a second destination no later than routing the first EDP to a first destination and meet FlexRay transmission cycle times when it has been determined that the second EDP has higher priority.

20 Claims, 4 Drawing Sheets

(56) References Cited

U.S. PATENT DOCUMENTS

| | | | |
|---|---|---|---|
| 2005/0254518 A1* | 11/2005 | Fujimori | 370/466 |
| 2007/0047565 A1* | 3/2007 | Van Moffaert et al. | 370/419 |
| 2007/0153811 A1* | 7/2007 | Venters et al. | 370/395.62 |
| 2009/0213870 A1* | 8/2009 | Terasawa et al. | 370/442 |
| 2010/0254382 A1* | 10/2010 | Steffen et al. | 370/389 |
| 2010/0268841 A1* | 10/2010 | Xhafa et al. | 709/231 |
| 2011/0128855 A1 | 6/2011 | Ando et al. | |

OTHER PUBLICATIONS

Lim, Hyung-Taek et al., "Challenges in a Future IP/Ethernet—based In-Car Network for Real-Time Applications," Design Automation Conference (DAC), 2011 48th ACM/EDAC/IEEE, IEEE, Jun. 5, 2011, p. 7-12.

Rahmani, Mehrnoush et al., "A Novel Network Architecture for In-Vehicle Audio and Video Communication," Broadband Convergence Networks, May 1, 2007, p. 1-12.

Koopman, Philip, "21 The FlexRay Protocol," Carnegie Mellon, Apr. 11, 2011.

Koopman, Philip, "23 The FlexRay Protocol," Carnegie Mellon, Apr. 6, 2009.

"Media Access," (2012) www.millinger-consulting.com.

"FlexRay Automotive Communication Bus Overview," National Instruments, Published Aug. 21, 2009.

* cited by examiner

FLEXRAY COMMUNICATIONS USING ETHERNET

CROSS-REFERENCES TO RELATED APPLICATIONS

The present application claims the benefit of U.S. Provisional Patent Application Ser. No. 61/674,834, entitled "Ethernet Adaptation Layer Function for FlexRay Controller," filed on Jul. 23, 2012, which is hereby incorporated by reference in its entirety for all purposes.

FIELD

The subject technology generally relates to network communications and, in particular, relates to implementing FlexRay communications using Ethernet.

BACKGROUND

FlexRay is a network communications protocol developed to govern on-board automotive computing. It is designed to be faster and more reliable than Control Area Network (CAN) and time triggered protocol (TTP). FlexRay may provide fault-free communication between various electronic components of a communication system, and may deliver error tolerance and time-determinism performance requirements for x-by-wire applications.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
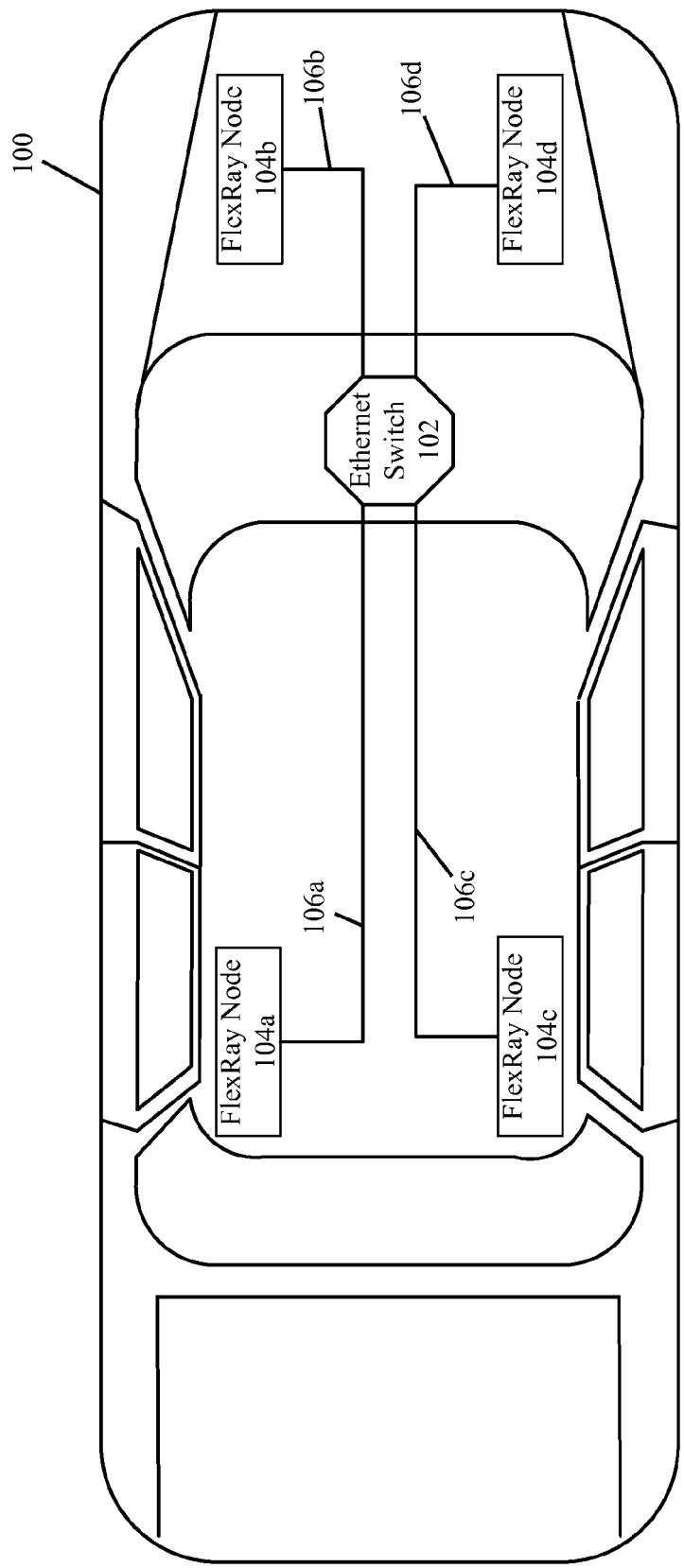
FIG. 1 illustrates an example of a vehicle including an Ethernet switch for implementing FlexRay communications between FlexRay nodes over Ethernet links, in accordance with various aspects of the subject technology.

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

A vehicle may have several to as many as 150 or more electronic control units (ECU) for various subsystems. One ECU is the engine control unit (also engine control module (ECM) or Powertrain Control Module (PCM) in automobiles). Other ECUs may be used for transmission, airbags, antilock braking, cruise control (e.g., adaptive cruise control), active suspension, drive-by-wire, electric power steering, audio systems, windows, doors, mirror adjustment, battery and recharging systems for hybrid/electric cars, etc. Some of these ECUs may form independent subsystems, but communications among others are important. A subsystem may need to control actuators or receive feedback from sensors.

FlexRay provides a standard for communicating between different FlexRay nodes such as ECUs. The nodes may be connected to a FlexRay bus, and each node may be able to send and receive FlexRay messages using the bus. FlexRay utilizes time-division multiple access (TDMA) for communication between the nodes. In particular, FlexRay provides a pre-set communication time cycle (e.g., 1 to 5 milliseconds) that includes multiple time slots, each of which may be assigned to a FlexRay node for use in sending a FlexRay message. A FlexRay message includes a data frame and a frame identification (ID) that identifies a time slot within the communication time cycle in which the data frame is scheduled to be transmitted.

The communication time cycle may include a static segment followed by a dynamic segment. The static segment reserves time slots for deterministic data that are scheduled to arrive at a destination at a fixed period, such as for standard, non-critical data. The dynamic segment reserves time slots for event-triggered data, such as for high priority, urgent data. Since the event-triggered data from one node can be transmitted over multiple dynamic time slots in the same communication time cycle, the dynamic segment is organized such that higher priority nodes (e.g., having higher priority messages with lower frame IDs) may be assigned dynamic time slots that are closer to the beginning of the dynamic segment, thereby ensuring that their higher priority data can be transmitted first. In one or more implementations, no two nodes may have the same priority. In some aspects, if two or more nodes have messages to send during a dynamic segment, the node sending the message with the numerically lower frame ID (e.g., representing a higher priority message) will transmit first because it would be assigned an earlier dynamic time slot. If this transmission occurs over multiple dynamic time slots and prevents the next lower priority node from sending its message, the next lower priority node may wait until the next communication time cycle to send its message (assuming that all higher priority nodes do not have any more messages to send during the dynamic segment of the next communication time cycle).

According to various aspects of the subject technology, FlexRay communications, including the sending of high priority messages during a dynamic segment, may be implemented using Ethernet. Ethernet is a familiar standard used by many networked computing devices, and provides, among other things, higher bandwidth, switching operations, and a well-defined set of fault errors for diagnosing and troubleshooting errors in communications. Thus, FlexRay communications may be implemented in a faster and more efficient manner using Ethernet. Furthermore, many other services are provided over Ethernet in vehicles, such as multimedia streaming, advanced driver assist functionality, single or multiple camera displays, lane departure warnings, pedestrian detection, intranet and internet traffic (e.g., over instrument panels), etc. Thus, using Ethernet to implement FlexRay communications between FlexRay nodes may allow for converging of communications onto a single standard and thereby simplify vehicle designs.

FIG. 1 illustrates an example of vehicle 100 including Ethernet switch 102 for implementing FlexRay communications between FlexRay nodes 104a, 104b, 104c, and 104d over Ethernet links 106a, 106b, 106c, and 106d, in accordance with various aspects of the subject technology. In some aspects, FlexRay nodes 104a, 104b, 104c, and 104d may be ECUs used for engine control, transmission control, airbags, antilock braking, cruise control (e.g., adaptive cruise control), active suspension, drive-by-wire, electric power steering, audio systems, windows, doors, mirror adjustment, battery and recharging systems for hybrid/electric cars, lighting, power locks, and/or other functions. Although only four FlexRay nodes are illustrated in FIG. 1, it is understood that FlexRay communications may be implemented using Ethernet for any number of FlexRay nodes. According to certain aspects, a FlexRay node having a FlexRay message to transmit (e.g., FlexRay node 104a) may include an Ethernet adaptation module that converts the FlexRay message into an Ethernet data packet. This Ethernet data packet may be received over an Ethernet link (e.g., Ethernet link 106a) by Ethernet switch 102, which may then transmit the Ethernet data packet to one or more receiving FlexRay nodes (e.g., FlexRay nodes 104b, 104c, and 104d) over one or more Ethernet links (e.g., Ethernet links 106b, 106c, and 106d). The one or more receiving FlexRay nodes may each include Ethernet adaptation modules that convert the Ethernet data packet to the original FlexRay message. According to certain aspects, Ethernet switch 102 may implement preemption switching (e.g., using the Institute of Electrical and Electronics Engineers (IEEE) 802.1 Qbu proposed standard) and/or time-aware scheduling (e.g., using the IEEE 802.1Qbv proposed standard) to transmit higher priority messages (e.g., event-triggered data from a particular FlexRay node) before transmitting other lower priority messages, even if those lower priority messages were received by Ethernet switch 102 no later than the high priority messages. Thus, aspects of the subject technology provide for the low-latency Ethernet transmission of high priority FlexRay messages.

Figure 2:
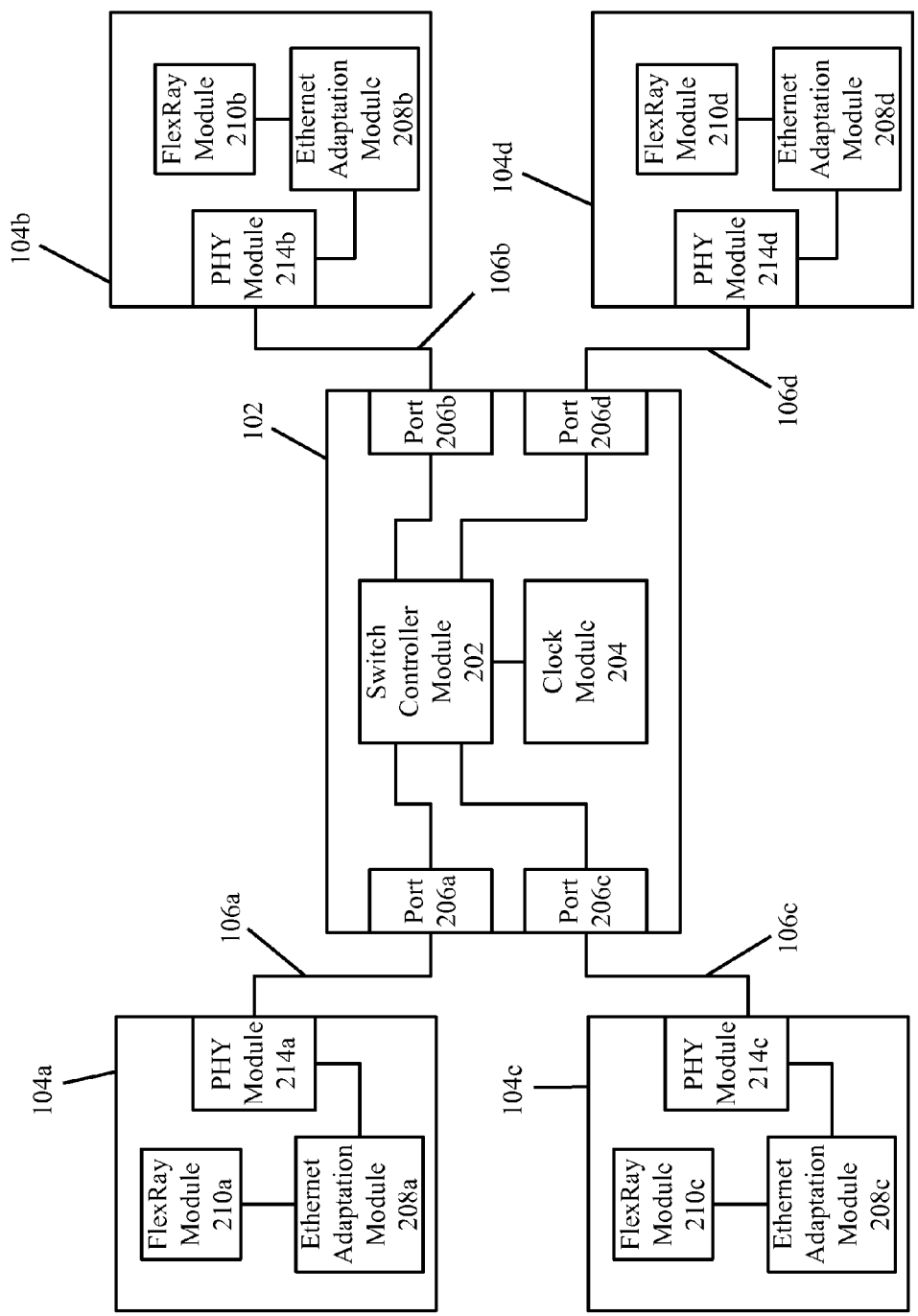
FIG. 2 is a block diagram illustrating components of an Ethernet switch and FlexRay nodes, in accordance with various aspects of the subject technology.

FIG. 2 is a block diagram illustrating components of Ethernet switch 102 and FlexRay nodes 104a, 104b, 104c, and 104d, in accordance with various aspects of the subject technology. Ethernet switch 102 includes ports 206a, 206b, 206c, and 206d, switch controller module 202, and clock module 204, which are in communication with one another. FlexRay node 104a includes Ethernet adaptation module 208a, FlexRay module 210a, and physical layer (PHY) module 214a, which are in communication with one another. Similarly, FlexRay node 104b includes Ethernet adaptation module 208b, FlexRay module 210b, and PHY module 214b. FlexRay node 104c includes Ethernet adaptation module 208c, FlexRay module 210c, and PHY module 214c. FlexRay node 104d includes Ethernet adaptation module 208d, FlexRay module 210d, and PHY module 214d. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

According to certain aspects, Ethernet switch 102 may facilitate the synchronization of timing for FlexRay nodes connected to Ethernet switch 102 (e.g., FlexRay nodes 104a, 104b, 104c, and 104d). In one or more implementations, clock module 204 includes logic, circuitry, and/or code for enabling Ethernet switch 102 to transmit and receive data packets according to timing cycles. Clock module 204 may generate a primary reference clock (e.g., from a free-running crystal oscillator) or receive the primary reference clock from another network component (e.g., another switch). Clock module 204 may provide the primary reference clock to switch controller module 202. Switch controller module 202 and/or a port (e.g., port 206a, 206b, 206c, and/or 206d) may include a transceiver (e.g., a receiver and transmitter), a scrambler, a descrambler, one or more digital signal processing blocks, and/or other components for supporting communications with other network equipment. In some aspects, switch controller module 202 provides the primary reference clock received from clock module 204 to the FlexRay nodes connected to Ethernet switch 102 (e.g., via corresponding ports such as port 206a, 206b, 206c, and/or 206d) in order to synchronize the timing among these nodes. According to certain aspects, switch controller module 202 and/or clock module 204 may derive and/or generate a FlexRay reference cycle clock to synchronize timing for FlexRay nodes connected to Ethernet switch 102 using the IEEE 802.1AS standard, the IEEE 1588 standard, and/or other standards.

A PHY module (e.g., PHY module 214a, 214b, 214c, or 214d) includes logic, circuitry, interfaces, and/or code for supporting communications with other network equipment. According to certain aspects, a PHY module may include a transceiver (e.g., a receiver and transmitter), a scrambler, a descrambler, one or more digital signal processing blocks, and/or other components for supporting communications with other network equipment. The PHY module may receive the primary reference clock from Ethernet switch 102 and provide the primary reference clock to a corresponding Ethernet adaptation module (e.g., Ethernet adaptation module 208a, 208b, 208c, or 208d).

According to certain aspects, an Ethernet adaptation module includes logic, circuitry, and/or code for adapting FlexRay communications to Ethernet communications and vice versa. In one or more implementations, an Ethernet adaptation module provides the primary reference clock (received from a corresponding PHY module) to a corresponding FlexRay module (e.g., FlexRay module 210a, 210b, 210c, or 210d). A FlexRay module includes logic, circuitry, and/or code for generating FlexRay messages. In one or more implementations, the FlexRay module includes a FlexRay controller. Each FlexRay message includes a data frame and a frame ID that identifies a time slot (based on the primary reference clock) in which the data frame is scheduled to be transmitted. This time slot may either be a static time slot (e.g., a time slot in the static segment of a communication time cycle) or a dynamic time slot (e.g., a time slot in the dynamic segment of the communication time cycle). An Ethernet adaptation module may generate an Ethernet data packet based on a FlexRay message received from a corresponding FlexRay module. According to certain aspects, the Ethernet adaptation module may encapsulate a FlexRay message as an Ethernet data packet, thereby allowing the FlexRay message to be transmitted over an Ethernet link. A PHY module may receive the Ethernet data packet from a corresponding Ethernet adaptation module and provide the Ethernet data packet to Ethernet switch 102 over an Ethernet link (e.g., Ethernet link 106a, 106b, 106c, or 106d). According to certain aspects, the PHY module may transmit the Ethernet data packet during the time slot identified by a frame ID of a corresponding FlexRay message.

According to various aspects of the subject technology, a port of Ethernet switch 102 (e.g., port 206a, 206b, 206c, or 206d) receives an Ethernet data packet from a respective FlexRay node (e.g., port 206a receives an Ethernet data packet from PHY module 214a of FlexRay node 104a over Ethernet link 106a, port 206b receives an Ethernet data packet from PHY module 214b of FlexRay node 104b over Ethernet link 106b, port 206c receives an Ethernet data packet from PHY module 214c of FlexRay node 104c over Ethernet link 106c, and/or port 206d receives an Ethernet data packet from PHY module 214d of FlexRay node 104d over Ethernet link 106d). The port may provide the received Ethernet data packet to switch controller module 202, which may route the Ethernet data packet to a destination via one or more other ports.

According to certain aspects, clock module 204 may determine when switch controller module 202 should route the Ethernet data packet to its intended destination. Since a FlexRay message may include information regarding a desired time slot of a communication time cycle in which the message should be transmitted, switch controller module 202 may extract this timing information, and clock module 204 may determine an acceptable time (e.g., a transmit clock) to transmit the Ethernet data packet to its intended destination. Clock module 204 may determine the transmit clock using the primary reference clock that it generated (e.g., from a free-running crystal oscillator) or received from another network component (e.g., another switch). Switch controller module 202 may transmit an Ethernet data packet according to a corresponding transmit clock generated by clock module 204. The PHY module may receive the Ethernet data packet from Ethernet switch 102. The corresponding Ethernet adaptation module may extract the FlexRay message from the Ethernet data packet and provide the FlexRay message to the corresponding FlexRay module.

Figure 3:
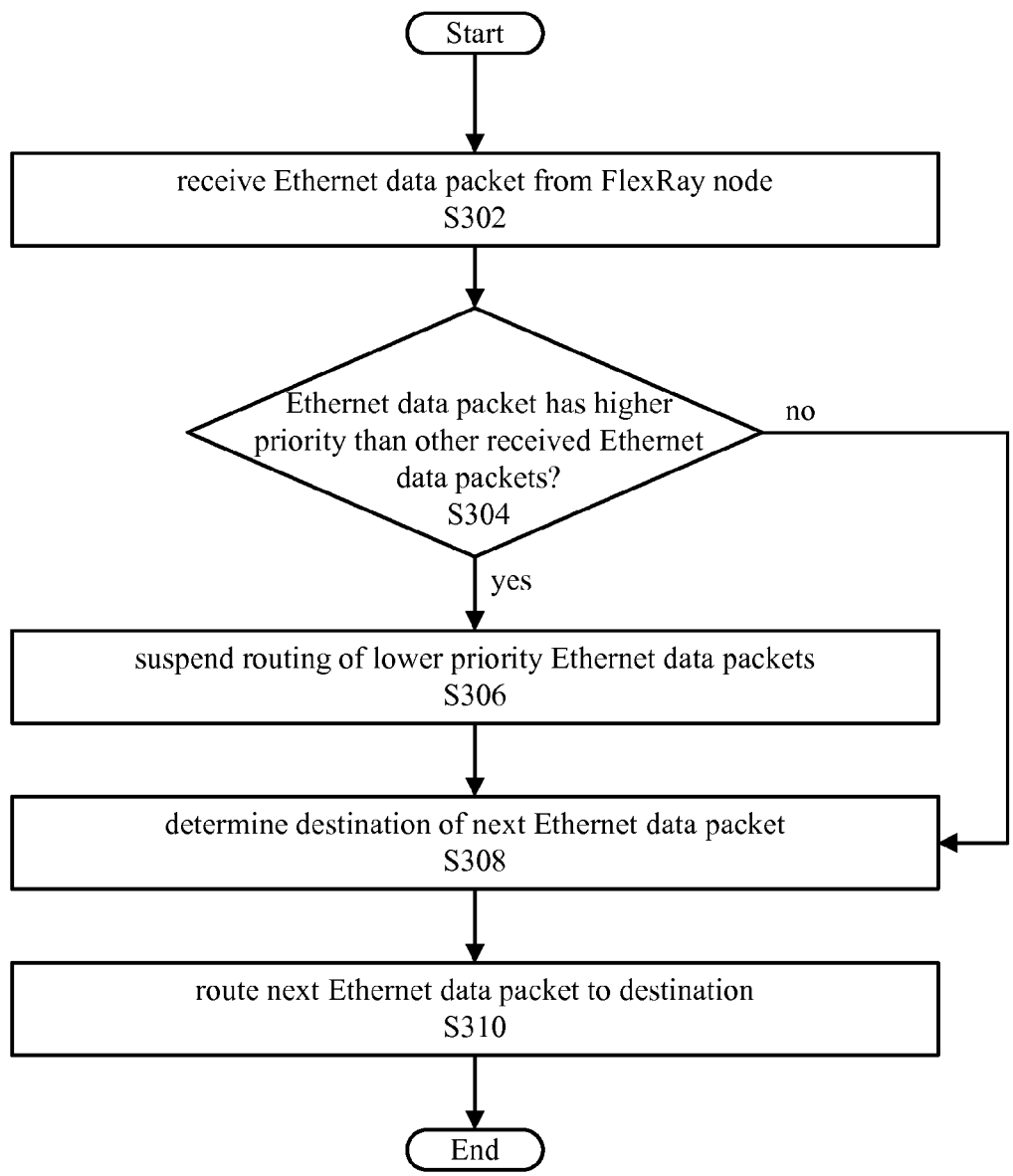
FIG. 3 illustrates an example of a method for implementing FlexRay communications between FlexRay nodes over Ethernet links, in accordance with various aspects of the subject technology.

FIG. 3 illustrates an example of method 300 for implementing FlexRay communications between FlexRay nodes 104a, 104b, 104c, and 104d over Ethernet links 106a, 106b, 106c, and 106d, in accordance with various aspects of the subject technology. Ethernet switch 102, for example, may be used to implement method 300. However, method 300 may also be implemented by systems having other configurations. Although method 300 is described herein with reference to the examples of FIGS. 1, 2 and 4, method 300 is not limited to these examples. Furthermore, method 300 does not necessarily need to be performed in the order as shown. Based upon design preferences, it is understood that the order of method 300 may be rearranged.

Assume, for the purposes of illustration, that FlexRay node 104a intends to transmit a first Ethernet data packet (including a first FlexRay message that includes a first data frame and a first frame ID) to FlexRay node 104b. Furthermore, assume that the first data frame is event-triggered data, and thus, the first frame ID identifies a dynamic time slot for transmission of the first data frame. Furthermore, assume that FlexRay node 104c intends to transmit a second Ethernet data packet (including a second FlexRay message that includes a second data frame and a second frame ID) to FlexRay node 104d. Assume that the second data frame is also event-triggered data, and thus, the second frame ID identifies a dynamic time slot for transmission of the second data frame. FlexRay nodes 104a and 104c may transmit the first Ethernet data packet and the second Ethernet data packet, respectively, to Ethernet switch 102, which receives these packets via ports 206a and 206c, respectively. Moreover, assume that Ethernet switch 102 receives the first Ethernet data packet no later than receiving the second Ethernet data packet. In other words, Ethernet switch 102 receives the second Ethernet data packet at the same time or later than the first Ethernet data packet is received (S302).

According to certain aspects, switch controller module 202 is configured to determine whether the second Ethernet data packet has higher priority than the first Ethernet data packet for transmission (S304). For example, since the first frame data and the second frame data are event-triggered data (and therefore may occupy the same dynamic time slots), switch controller module 202 can determine which of these data frames (and corresponding Ethernet data packet) has priority for transmission. According to certain aspects, switch controller module 202 determines whether the second Ethernet data packet has higher priority than the first Ethernet data packet based on the first frame ID and the second frame ID. Switch controller module 202 may emulate the FlexRay prioritization process by giving higher priority to Ethernet data packets that are associated with lower frame IDs. If the second Ethernet data packet is determined to not have higher priority than the first Ethernet data packet (e.g., the second frame ID is greater than the first frame ID), switch controller module 202 may proceed with determining a destination of the next Ethernet data packet (e.g., the first Ethernet data packet) for transmission (S308). However, if the second Ethernet data packet is determined to have higher priority than the first Ethernet data packet (e.g., the second frame ID is less than the first frame ID), switch controller module 202 suspends routing of the first Ethernet data packet to allow the second Ethernet data packet to be transmitted (S306).

Assuming, for the purposes of illustration, that the second Ethernet data packet has higher priority than the first Ethernet data packet and routing of the first Ethernet data packet is suspended, switch controller module 202 determines a destination of the second Ethernet data packet (S308). According to certain aspects, the second FlexRay message from the second Ethernet data packet may include information regarding its intended destination. In this situation, switch controller module 202 may determine the destination of the second Ethernet data packet by extracting the intended destination information from the second FlexRay message. In some aspects, the destination may be predetermined. For example, one or more nodes (e.g., FlexRay node 104b, 104c, and/or 104d) may be predetermined to receive all data packets originating from FlexRay node 104c. This predetermined destination may be provided to and/or stored in Ethernet switch 102. In this regard, switch controller module 202 may determine the destination of the second Ethernet data packet by looking up the predetermined destination. As discussed above, the intended destination of the second Ethernet data packet is FlexRay node 104d. Thus, switch controller module 202 may determine that FlexRay node 104d is the destination of the second Ethernet data packet.

Although the destination of the second Ethernet data packet is described as being determined after routing of the first Ethernet data packet is suspended, this destination may be determined at any time before the second Ethernet data packet is routed, such as immediately after the second Ethernet data packet is received, before the priority of the second Ethernet data packet is determined, before routing of the first Ethernet data packet is suspended, etc. In some aspects, the destination of the first Ethernet data packet may also be determined any time before the first Ethernet data packet is routed, even before the second Ethernet data packet is routed.

According to certain aspects, switch controller module 202 routes the second Ethernet data packet to the determined destination via one or more corresponding ports (S310). For example, switch controller module 202 may route the second Ethernet data packet to FlexRay node 104d via port 206d. After the second Ethernet data packet has been routed, switch controller module 202 may resume routing of the first Ethernet data packet. In one or more implementations, switch controller module 202 may determine the intended destination of the first Ethernet data packet, which in this case is FlexRay node 104*b*, and route the first Ethernet data packet to FlexRay node 104*b* via port 206*b*.

Although the second Ethernet data packet is described as being routed before the first Ethernet data packet (e.g., because the second Ethernet data packet has higher priority than the first Ethernet data packet), the second Ethernet data packet and the first Ethernet data packet may also be routed at the same time even though the second Ethernet data packet has higher priority than the first Ethernet data packet. In one or more implementations, assuming the first and second Ethernet data packets do not have the same destination, which in this situation is true since the intended destination of the first Ethernet data packet is FlexRay node 104*b* while the intended destination of the second Ethernet data packet is FlexRay node 104*d*, switch controller module 202 may route the first Ethernet data packet and the second Ethernet data packet to their intended destinations at the same time (e.g., during the same transmission cycle) since these Ethernet data packets would not share the same Ethernet link for transmission.

According to various aspects of the subject technology, FlexRay bus status signaling (e.g., FlexRay bus guardian status signaling) may be propagated using Ethernet. This signaling may include FlexRay error messages. Switch controller module 202 may detect a FlexRay message error (e.g., an excessive cyclic redundancy check error, a local address not-reachable and/or not-listened-to error, etc.), and generate a corresponding Ethernet fault message based on the detected FlexRay message error. Switch controller module 202 may route the generated Ethernet fault message to the FlexRay node to which the error is applicable. The Ethernet adaptation module of this FlexRay node may receive the Ethernet fault message (via the corresponding PHY module), generate the corresponding FlexRay message error based on the received Ethernet fault message, and provide the FlexRay message error to the corresponding FlexRay module. In some aspects, the Ethernet adaptation module may also report cable faults (e.g., short, open, improper transmission line, etc.) to the FlexRay module.

Although the FlexRay communications are described above as being implemented using Ethernet switch 102, the FlexRay communications may also be implemented using a shared Ethernet bus operation (e.g., FlexRay nodes 104*a*, 104*b*, 104*c*, and 104*d* may transmit directly over a shared Ethernet link). A shared Ethernet bus operation may include the IEEE 802.3 Carrier-Sense, Multiple Access/Collision Detection (CSMA/CD) method, the master-slave timeslot access IEEE 802.3 Ethernet PON method, or variants thereof. In a shared Ethernet bus operation, each FlexRay node may transmit and receive Ethernet data packets as described above, except that the transmission and receipt of the Ethernet data packets are over a single Ethernet link. Thus, all FlexRay nodes may listen to the transmissions occurring over the Ethernet link. Furthermore, the Ethernet adaptation module of each FlexRay node may monitor the Ethernet link during a dynamic time slot and inform a corresponding FlexRay module of whether the Ethernet link is free for transmission during the dynamic time slot. If so, a FlexRay node interested in transmitting a data frame during this time slot may do so. If the Ethernet link is not free for transmission (e.g., because a higher priority FlexRay node is transmitting during this time), a lower priority FlexRay node interested in transmitting may wait until a later transmission cycle to transmit its data frame.

Figure 4:
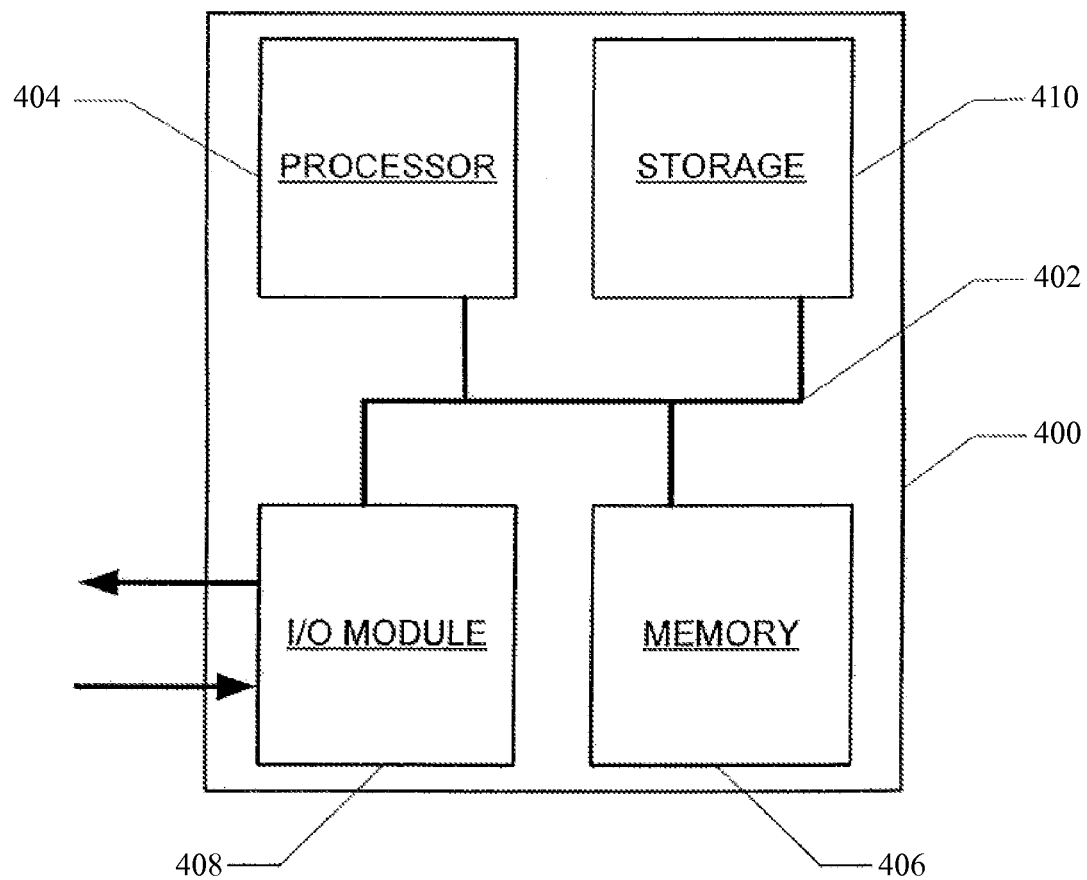
FIG. 4 is a block diagram illustrating components of a controller, in accordance with various aspects of the subject technology.

FIG. 4 is a block diagram illustrating components of controller 400, in accordance with various aspects of the subject technology. Controller 400 comprises processor module 404, storage module 410, input/output (I/O) module 408, memory module 406, and bus 402. Bus 402 may be any suitable communication mechanism for communicating information. Processor module 404, storage module 410, I/O module 408, and memory module 406 are coupled with bus 402 for communicating information between any of the modules of controller 400 and/or information between any module of controller 400 and a device external to controller 400. For example, information communicated between any of the modules of controller 400 may include instructions and/or data. In some aspects, bus 402 may be a universal serial bus. In some aspects, bus 402 may provide Ethernet connectivity.

In some aspects, processor module 404 may comprise one or more processors, where each processor may perform different functions or execute different instructions and/or processes. For example, one or more processors may execute instructions for implementing FlexRay communications using Ethernet, and one or more processors may execute instructions for input/output functions.

Memory module 406 may be random access memory ("RAM") or other dynamic storage devices for storing information and instructions to be executed by processor module 404. Memory module 406 may also be used for storing temporary variables or other intermediate information during execution of instructions by processor 404. In some aspects, memory module 406 may comprise battery-powered static RAM, which stores information without requiring power to maintain the stored information. Storage module 410 may be a magnetic disk or optical disk and may also store information and instructions. In some aspects, storage module 410 may comprise hard disk storage or electronic memory storage (e.g., flash memory). In some aspects, memory module 406 and storage module 410 are both a machine-readable medium.

Controller 400 may be coupled via I/O module 408 to a system control and management system (e.g., a vehicle central gateway), drive train system control unit, and/or a user interface, which may allow a user to communicate information and select commands to controller 400 as well as receive information from controller 400. For example, a vehicle central gateway may provision bandwidth, log fault diagnostics, reset and recover actions, and log statistics. The user interface may be a monitor (e.g., liquid crystal display (LCD), a light emitting diode (LED) display, an organic light emitting diode (OLED) display, a flexible display, a flat panel display, a solid state display) for displaying information to a user. The user interface may also include, for example, a keyboard, a mouse, or any device with sensory feedback, visual feedback, auditory feedback, and/or tactile feedback coupled to controller 400 via I/O module 408 for communicating information and command selections to processor module 404.

According to various aspects of the subject technology, methods described herein may be executed by controller 400. In one or more implementations, processor module 404 executes one or more sequences of instructions contained in memory module 406 and/or storage module 410. In some aspects, instructions may be read into memory module 406 from another machine-readable medium, such as storage module 410. In some aspects, instructions may be read directly into memory module 406 from I/O module 408, for example from a user via the user interface. Execution of the sequences of instructions contained in memory module 406 and/or storage module 410 may cause processor module 404 to perform methods to implement FlexRay communications using Ethernet. In one or more implementations, a computational algorithm for implementing FlexRay communications using Ethernet may be stored in memory module 406 and/or storage module 410 as one or more sequences of instructions. Information such as an Ethernet data packet, a FlexRay message, a destination, timing information, a FlexRay message error, an Ethernet fault message, and/or other information may be communicated from processor module 404 to memory module 406 and/or storage module 410 via bus 402 for storage. In some aspects, the information may be communicated from processor module 404, memory module 406, and/or storage module 410 to I/O module 408 via bus 402. The information may then be communicated from I/O module 408 to a user via the user interface.

One or more processors in a multi-processing arrangement may also be employed to execute the sequences of instructions contained in memory module 406 and/or storage module 410. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 404 for execution. Such a medium may take many forms, including, but not limited to, non-volatile media and volatile media. Non-volatile media include, for example, optical or magnetic disks, such as storage module 410. Volatile media include dynamic memory, such as memory module 406. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An Ethernet switch for implementing FlexRay communications between a plurality of FlexRay nodes, the Ethernet switch comprising:
a plurality of ports each of which is configured to receive an Ethernet data packet from a respective FlexRay node over a respective Ethernet link, each Ethernet data packet comprising a FlexRay message, each FlexRay message comprising at least one of a data frame and a frame identification (ID), wherein a first Ethernet data packet is received at a first one of the plurality of ports no later than a second Ethernet data packet is received at a second one of the plurality of ports; and
a controller module configured to determine whether the second Ethernet data packet has higher priority than the first Ethernet data packet based on the frame ID associated with the first Ethernet data packet and the frame ID associated with the second Ethernet data packet,
wherein the controller module is further configured to route the first Ethernet data packet to a first destination and the second Ethernet data packet to a second destination, the controller module being configured to route the second Ethernet data packet to the second destination no later than routing the first Ethernet data packet to the first destination when it has been determined that the second Ethernet data packet has higher priority than the first Ethernet data packet.

2. The Ethernet switch of claim 1, wherein each of the plurality of FlexRay nodes comprises a FlexRay controller and an Ethernet adaptation module.

3. The Ethernet switch of claim 1, wherein the controller module is configured to route the second Ethernet data packet to the second destination before routing the first Ethernet data packet to the first destination when it has been determined that the second Ethernet data packet has higher priority than the first Ethernet data packet.

4. The Ethernet switch of claim 1, wherein each frame ID identifies a time slot in which a corresponding data frame is scheduled to be transmitted, wherein the frame ID associated with the second Ethernet data packet identifies a dynamic time slot, wherein the frame ID associated with the first Ethernet data packet identifies a dynamic time slot, and wherein the frame ID associated with the second Ethernet data packet is less than the frame ID associated with the first Ethernet data packet.

5. The Ethernet switch of claim 1, wherein the controller module is configured to suspend the routing of the first Ethernet data packet when it has been determined that the second Ethernet data packet has higher priority than the first Ethernet data packet.

6. The Ethernet switch of claim 5, wherein the controller module is further configured to resume routing of the first Ethernet data packet after the second Ethernet data packet has been routed.

7. The Ethernet switch of claim 1, wherein the controller module is further configured to determine the second destination.

8. The Ethernet switch of claim 7, wherein the second destination comprises a) a single one of the plurality of FlexRay nodes excluding the FlexRay node corresponding to the second one of the plurality of ports, b) two or more of the plurality of FlexRay nodes excluding the FlexRay node corresponding to the second one of the plurality of ports, or c) all of the plurality of FlexRay nodes excluding the FlexRay node corresponding to the second one of the plurality of ports.

9. The Ethernet switch of claim 1, further comprising a clock module coupled to the controller module, wherein the clock module is configured to provide a primary reference clock to the controller module, and wherein the controller module is configured to provide the primary reference clock to one or more of the plurality of FlexRay nodes.

10. The Ethernet switch of claim 9, wherein the clock module is further configured to generate a transmit clock based on a timing of the FlexRay message associated with the second Ethernet data packet, and wherein the controller module is configured to route the second Ethernet data packet based on the transmit clock.

11. The Ethernet switch of claim 1, wherein the controller module is configured to detect a FlexRay message error and to transmit an Ethernet fault message to one or more of the plurality of FlexRay nodes based on the detection of the FlexRay message error.

12. A FlexRay node for implementing FlexRay communications using Ethernet, the FlexRay node comprising:
an Ethernet adaptation module configured to receive a reference clock; and
a FlexRay module configured to generate a FlexRay message based on the reference clock, the FlexRay message comprising a data frame and a frame identification (ID) identifying a time slot based on the reference clock in which the data frame is scheduled to be transmitted,
wherein the Ethernet adaptation module is configured to generate an Ethernet data packet based on the FlexRay message and to provide the Ethernet data packet to a transceiver for transmitting the Ethernet data packet to a destination over an Ethernet physical channel.

13. The FlexRay node of claim 12, wherein the Ethernet adaptation module is configured to encapsulate the FlexRay message as the Ethernet data packet.

14. The FlexRay node of claim 12, further comprising the transceiver, wherein the transceiver is configured to transmit the Ethernet data packet to the destination, wherein the transceiver is configured to receive the reference clock over the Ethernet physical channel, and wherein the transceiver is configured to transmit the Ethernet data packet during the time slot.

15. The FlexRay node of claim 12, wherein the Ethernet physical channel comprises a shared Ethernet bus.

16. The FlexRay node of claim 12, wherein the Ethernet adaptation module is configured to detect an Ethernet fault message and provide a FlexRay message error to the FlexRay module based on the detection of the Ethernet fault message.

17. A method for implementing FlexRay communications between a plurality of FlexRay nodes using Ethernet, the method comprising:

receiving a first Ethernet data packet from a first one of the plurality of FlexRay nodes and a second Ethernet data packet from a second one of the plurality of FlexRay nodes, the first Ethernet data packet being received no later than the second Ethernet data packet, the first Ethernet data packet comprising a first FlexRay message having at least one of a first data frame and a first frame identification (ID), the second Ethernet data packet comprising a second FlexRay message having at least one of a second data frame and a second frame ID;

determining whether the second Ethernet data packet has higher priority than the first Ethernet data packet based on the first frame ID and the second frame ID;

suspending routing of the first Ethernet data packet when it has been determined that the second Ethernet data packet has higher priority than the first Ethernet data packet; and routing the second Ethernet data packet to a second destination no later than routing the first Ethernet data packet to a first destination based on the suspension of routing of the first Ethernet data packet.

18. The method of claim 17, further comprising determining the first destination and the second destination, wherein the first destination comprises a first set of the plurality of FlexRay nodes, and wherein the second destination comprises a second set of the plurality of FlexRay nodes different from the first set of the plurality of FlexRay nodes.

19. The method of claim 18, wherein the second Ethernet data packet is routed to the second destination at the same time as when the first Ethernet data packet is routed to the first destination.

20. The method of claim 17, wherein the first Ethernet data packet and the second Ethernet data packet are routed over a shared Ethernet bus.

* * * * *